United States Patent [19]
Dawes et al.

[11] Patent Number: 5,137,553
[45] Date of Patent: Aug. 11, 1992

[54] MOLECULAR JET SEPARATOR

[75] Inventors: Ernest F. Dawes, East Melbourne; Peter A. Dawes, Park Orchards, both of Australia

[73] Assignee: SGE International Pty. Ltd., Australia

[21] Appl. No.: 661,415

[22] Filed: Feb. 26, 1991

[30] Foreign Application Priority Data

Mar. 2, 1990 [AU] Australia ................. PJ8893

[51] Int. Cl.$^5$ ............................................ B01D 57/00
[52] U.S. Cl. ............................................ 55/392; 55/17
[58] Field of Search .................................. 55/17, 392

[56] References Cited

U.S. PATENT DOCUMENTS

| | | | |
|---|---|---|---|
| 3,633,027 | 1/1972 | Ryhage | 250/41.95 |
| 3,912,470 | 10/1975 | Fluckiger | 55/392 |
| 3,957,470 | 5/1976 | Dawes | 55/17 |

FOREIGN PATENT DOCUMENTS 448489 6/1936 United Kingdom ....... 261/DIG. 26

OTHER PUBLICATIONS

Ryhage, "Efficiency of molecule separators used in gas chromatography-mass spectrometer applications", Arkiv for Kemi Band 26 nr 26, May 25, 1966, pp. 305–316..

Primary Examiner—Bernard Nozick
Attorney, Agent, or Firm—Harness, Dickey & Pierce

[57] ABSTRACT

A molecular jet separator includes a body which defines an evacuation chamber. A bore in the body traverses the chamber so that the bore has two segments on opposite sides of the chamber. Respective tubes are seated in these bore segments, with their opposed ends in direct or indirect engagement within the chamber, in a firm fit so that the bores of the tubes are substantially aligned. The bores of the tubes are open at the aforesaid opposed ends, and at least one of these opposed ends is shaped to define a predetermined gap between the opposed open ends of the tube bores.

7 Claims, 1 Drawing Sheet

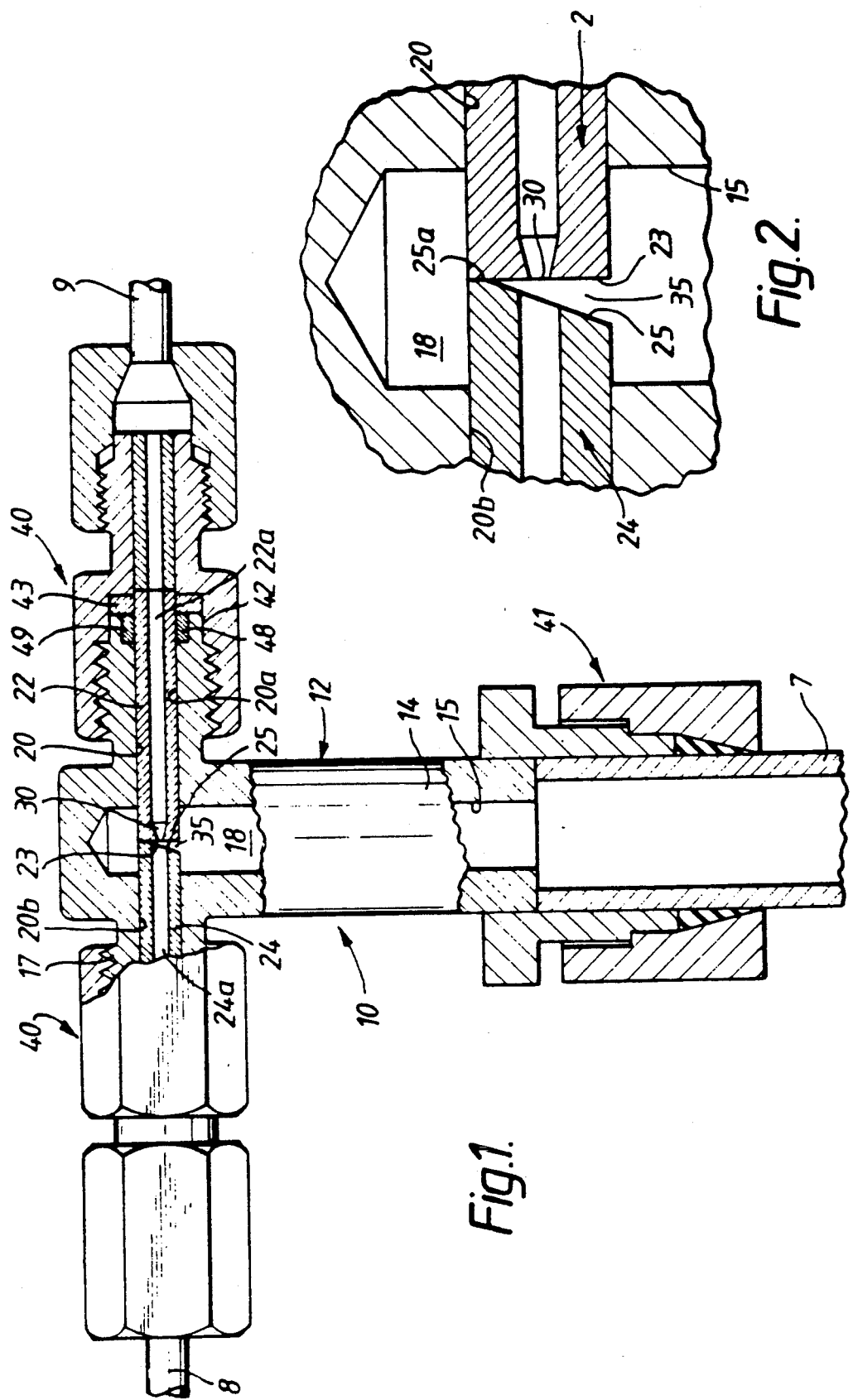

MOLECULAR JET SEPARATOR

FIELD OF THE INVENTION

This invention relates to an improved molecular jet separator.

BACKGROUND ART

Molecular jet separators are typically used for separating a carrier gas from a sample in gaseous form, for further analysis. In an important application, a molecular separator is connected to interface the output of a gas chromatograph to the input of the ion source of a mass spectrometer. The separator is said to enrich the sample and it is desirable that the separator achieve maximum enrichment as well as optimum yield of the sample. By "yield" is meant the proportion of the sample transferred from the inlet to the outlet of the separator.

A known form of molecular jet separator is disclosed in U.S. Pat. No. 3,957,470 to Dawes. This separator comprises an integral glass component which includes a pair of accurately aligned input and output tubes with a fine evacuation gap between their opposed open ends, and a surrounding envelope which defines an evacuation chamber and includes a tubular outlet for connection to a vacuum pump. This design had the advantage that it could be formed from a single piece of glass tubing which is either bridged to ensure alignment when a gap is cut fully through the tubing, or is provided with a transverse slot to form the gap. A jet orifice may be provided at the gap in the inlet segment of the tubing.

A separator of the general type disclosed in U.S. Pat. No. 3,957,470 has proven satisfactory for some years but has been found to have a number of limitations which prevent its optimum application with modern capillary column gas chromatographs. These existing molecular jet separators acquire a minimum flow typically in the range 20 to 50 mls per minute, a limitation which arises in part from the minimum gap width of about 100 micron and from a minimum inlet orifice at the gap of a similar order. Capillary column flows are typically substantially less than 20 mls per minute and one practice adopted to overcome the problem has been to augment the flow from the gas chromatograph with additional carrier gas upstream of the separator. This practice is somewhat counterproductive and tends to reduce the resultant yield of the separator.

Prior one-piece separators have two other disadvantages which arise from their physical form. Where it is desired to provide for varying jet orifices and/or evacuation gaps to suit different input gasses or input sources, the whole unit must be changed over. There is also a problem in cleaning the units if they become blocked in the region of the jet orifice or gap.

DISCLOSURE OF THE INVENTION

It is therefore an objective of the present invention to provide an improved molecular jet separator which at least in part alleviates one or more of the aforementioned disadvantages.

Any attempt to improve the construction of a molecular jet separator must ensure that it remains possible to accurately and reliably form the evacuation gap, as the predictability of this gap is important in ensuring reliable operation of the separator. It is also desirable for many applications, e.g. the interfacing of a gas chromatograph to a mass spectrometer, that the flow path be an alert interface.

The invention accordingly provides a molecular separator which includes a body defining an evacuation chamber. A bore in said body traverse the chamber so that the bore has two segments on opposite sides of the chamber. Respective tubes are seated in these bore segments, with their opposed ends in direct or indirect engagement within the chamber, in a firm fit so that the bores of the tubes are substantially aligned. The bores of the tubes are open at their opposed ends, and at least one of these opposed ends is shaped to define a predetermined gap between the opposed open ends of the tube bores.

The shaping of at least one of the opposed ends of the tubes to define a predetermined gap advantageously comprises a planar end of the tube formed at a predetermined angle to the axis of tube which is selected to provide the required evacuation gap. With this configuration, the side of the tube which then includes an acute angle between the outer tube surface and said planar end is preferably truncated to form a normal surface portion defining the actual end of the tube, thereby avoiding a sharp edge which might otherwise dig into the other tube. Other configurations may of course be employed, e.g. an accurate rebate at the end of the tube. In either case, the reliability of the gap is preserved by an accurate spacing between the two bores when the tubes are brought into end to end contact.

The tubes preferably have a relatively inert bore surface e.g. of glass or silica. One of the tubes, preferably one not shaped as described to define the predetermined gap, has its bore narrowed at the end which opens at the gap to form an inlet jet orifice.

The body may be provided by a generally T-shaped member in which the stem has a blind bore forming the evacuation chamber and the arms contain the outer ends of the transverse bore. The remote end of the stem and the outer ends of the arms may comprise standard fittings for attaching the separator to a vacuum system and to glass capillary lines.

BRIEF DESCRIPTION OF THE DRAWINGS

The invention will now be further described, by way of example only, with reference to the accompanying drawings, in which:

FIG. 1 is a partially sectioned cross-sectional view of a molecular jet separator in accordance with a preferred embodiment of the invention, shown in position, in a glass capillary line interfacing, for example, the output of a gas chromatograph to the input of a mass spectrometer;

FIG. 2 is an enlargement of part of FIG. 1.

BEST MODE(S) FOR CARRYING OUT THE INVENTION

The illustrated molecular separator 10 includes a T-piece body 12 with a cylindrical stem 14 and co-axial cylindrical arms 16, 17. A blind bore 15 in stem 14 extends from the remote end of the stem to just past the arms 16, 17 and defines an evacuation chamber 18. A bore 20 extends coaxially in the arms 16, 17 and traverses chamber 18 so that the bore is divided into two bore segments 20a, 20b on opposite sides of chamber 18.

Seated in a firm fit in bore segments 20a, 20b are respective internally glass or silica lined tubes 22, 24 which project from the outer ends of arms 16, 17 but extend into chamber 18 so that the opposed inner ends 23, 25 are in direct engagement within the chamber. Tubes 22, 24 may alternatively be formed of any suitable material which is substantially internally inert for the purpose required, e.g. stainless steel or a material internally lined with gold. By providing tubes 22, 24 as a firm fit in bore segments 20a, 20b, the respective bores 22a, 24a of the tubes are accurately aligned. These bores are opened at their inner opposed ends.

Tube 22, which serves as the inlet tube, has its bore 22a contracted at the inner end to form a reduced diameter jet orifice 30. The end face 23 of tube 22 contains jet orifice 30 and is formed substantially normal to the axis of the tube. On the other hand, end face 25 of tube 24 is shaped to define a predetermined gap 35 between the opposed open ends of tubes 22, 24. In this case, the shaping comprise forming end face 25 as a planar face at a predetermined angle less than 90° to the axis of tube 24. The resultant includes acute angle at one side of the tube between the outer curved surface of the tube and end face 25 is truncated to form a normal segment 25a of the face 25 (FIG. 2). This is done to avoid a sharp edge which might otherwise dig into end face 23 of tube 22.

Tubes 22, 24 may be fixed in place in the respective bore segments during manufacture but it would be more typical and advantageous for the tubes to be a firm sliding fit so that they are replaceable and interchangeable with other tubes having different bores or jet orifices, or different angular cuts for end face 25 and therefore different sized gaps 35. In this case, the tubes are retained in place by internally threaded end fittings 40, 40' which engage external threads on arms 16, 17 and each carry a gasket such as a graphitised vespel ring or ferrule 43. At the end of tube 22, ferrule 43 engages a bush 48 fixed about the respective tube. Bush 48 itself seats in a short, larger diameter bore portion 49 at the outer end of bore segment 20a. This arrangement sets end face 23 substantially at the center of chamber 18. On the other hand, tube 24 does not carry a bush, in order to ensure that it can be pushed until its end face 25 is firmly against end face 23. Tube 24 is retained by the enclosing pressure of ferrule 43 on firm engagement of end fitting 40'. Of course, these arrangements can be reversed, so that bush 48 is on tube 24.

In situ, molecular separator 10 would be typically arranged with the inlet tube 22 in communication with glass lined tubing or silica tubing 9, or other suitable inert tube, from the capillary column of a gas chromatograph, and outlet tube 24 in communication with glass lined or silica tubing 8 leading to the input of a mass spectrometer. End fittings 40 would be of any suitable type to make this connection and alternative fittings may be provided to suit different kinds of tubing. The stem 14 of two-piece body 12 would be sealingly coupled at fitting 41 by a suitable evacuation 7 line to a vacuum pump. Sample in gaseous form in a carrier gas in then continuously flowed along tube 22 to jet orifice 30. A substantial proportion of the sample species, the yield of the separator, continues into tube 24 and a major portion of the carrier gas passes into the evacuation chamber at gap 35.

The illustrated arrangement has a number of important advantages. Because the tubes are in end-to-end contact and the gap can be predetermined by any suitable accurate formation of the end of one or both of the tubes, reliable and predictable gap sizes down to as small as 10 microns can be provided. In the illustrated embodiment, the angular planar cut to form end face 25 is able to be made with considerable accuracy. In a typical case employing tube 24 of 350 micron I.D., the angular cut for most applications would be in the range 70° to 88° with respect to the axis of tube 24. Because the jet orifice 30 can be preformed, it may be a small as 10 micron, compared with a typical minimum of 100 micron in prior separators. With these facilities, gas capillary flows as low as 1 ml per minute can be successfully input to the separator. The tubes may be larger diameter tubes counterbored to form jet orifice 30 and, in some cases, a further orifice at face 25 in outlet tube 24.

By being internally glass-lined, tubes 22, 24 form an inert interface between the gas chromatograph and the mass spectrometer. The combination of separate inlet and outlet tubes in an accurate cross-bore allows the required accurate alignment of the inlet and outlet passages but still permits the gap to be preformed and the tubes to be changed over to vary the size of the gap and/or the size of the jet orifice. Moreover, if blockage occurs, the assembly can be readily dismantled, cleaned and reassembled. Because the T-piece body can be formed in a suitable metal, the construction is generally more robust than, e.g., the glass unit of U.S. Pat. No. 3,957,470.

In an adaptation of the illustrated assembly, the assembly including fittings 40 may be mounted within an external sealed housing. There is no stem 14 but instead chamber 18 opens through the side of the unit directly to the interior of the housing. The housing is in turn connectable to a vacuum pump for evacuating the interior of the housing and thereby the chamber 18. This arrangement may be inserted as a complete unit, e.g. into the interface between the outlet of a gas chromatograph and the inlet of a mass spectrometer.

It will be appreciated that, in a modification, the end faces 23, 25 need not necessarily be in direct engagement but may be in indirect engagement, e.g. by engaging respective faces or edges of an intermediate member. In another alternative, one of the tubes may carry an intermediate member which is directly engaged by the other tube.

We claim:

1. A molecular jet separator comprising:
   a body defining an evacuation chamber including an outlet;
   a tubular bore in said body traversing the chamber whereby the bore has two segments on opposite sides of said chamber;
   respective tubes seated and slidably received in said bore segments, with at least a portion of their opposed adjacent ends in engagement with each other within said chamber, in a firm fit so that the bores of the tubes are substantially aligned, said bores of tubes being open at said opposed adjacent ends;
   wherein one of said opposed adjacent ends of one of said tubes has an offset portion which, defines a predetermined gap between the opposed open adjacent ends of the tube.

2. A molecular jet separator according to claim 1 wherein said tubes are removably mounted in said bore segments for replacement with other tubes to vary said gap.

3. A molecular jet separator according to claim 1 wherein at least one of said tubes has its bore narrowed at the end which opens at the gap to form a jet orifice.

4. A molecular jet separator according to claim 1 wherein one of said opposed adjacent ends of one of said tubes has a planar end of the tube formed at a predetermined acute angle to the axis of the tube which is selected to provide said predetermined gap.

5. A molecular jet separator according to claim 4 wherein the side of the tube which then includes an acute angle between the outer curved surface of the tube and said planar end is truncated to form a normal surface segment defining the actual end of the tube, thereby avoiding a sharp edge which might otherwise dig into the other tube.

6. A molecular jet separator according to claim 1 wherein said body is provided by a genereally T-shaped member including a stem and a pair of arms, in which the stem has a blind bore forming the evacuation chamber and the arms contain the outer ends of the respective bore segments.

7. A molecular jet separator according to claim 6 wherein the remote end of said stem and the outer ends of said arms carry standard fittings for attaching the separator to a vacuum system and to capillary tubing.

* * * * *